Aug. 1, 1967   B. BURWELL   3,333,916
PROCESS FOR PRODUCING PURE FUSED VANADIUM OXIDE
FROM AMMONIUM METAVANADATE
Filed Aug. 12, 1963   3 Sheets-Sheet 3

INVENTOR.
Blair Burwell
BY
ATTORNEYS

United States Patent Office 3,333,916
Patented Aug. 1, 1967

3,333,916
PROCESS FOR PRODUCING PURE FUSED
VANADIUM OXIDE FROM AMMONIUM
METAVANADATE
Blair Burwell, P.O. Box 1951, Grand Junction,
Colo. 81501
Filed Aug. 12, 1963, Ser. No. 301,305
8 Claims. (Cl. 23—21)

ABSTRACT OF THE DISCLOSURE

Production of high purity vanadium oxide in a continuous operation by deammoniating ammonium metavanadate in a furnace maintaining temperatures between 400° C. and 500° C., feeding the resulting ammonia-free vanadium pentoxide powder in a thin stream into a fusion furnace maintaining temperatures between 500° C. and about 800° C. under oxidizing conditions with flame impinging on exposed surfaces of the powder stream to melt same, separating the melt from the feed stream, and chilling the melt to form a dust-free product.

---

This invention relates to an improved method of producing pure vanadium oxide in a fused and crystalline form from ammonium metavanadate.

Methods for recovering vanadium from its ores usually yield vanadium oxide in a chemical precipitate known as red cake. Red cake is a sodium vanadate complex containing from 87 to 95 percent $V_2O_5$ in a finely-divided form and is treated by heating and melting to expel moisture and form fused crystalline flakes or particles known as fused oxide in the trade. Fused oxide is used to make ferro vanadium or aluminum vanadium alloys by aluminothermic reduction. Conventionally this is done by a batch operation involving loading the wet red cake into a furnace where it is exposed to temperatures from 700° to 800° C., whereupon the moisture is expelled and the precipitate reduced to a melt. The molten sodium vanadium pentoxide then flows out of the furnace and is cast into flakes or particles suitable for reduction into metal.

In recent years, there has been an increasing demand for pure $V_2O_5$ in the form of fused oxide containing 99.5% $V_2O_5$ or more, and low in sodium compounds. This is made from a chemical precipitate of ammonium metavanadate ($NH_4VO_3$) by processes similar to the treatment of red cake, which consist of adding the wet precipitate to a drying and heating furnace.

A problem exists in producing pure fused oxide from the ammonia salt, or ammonium metavanadate in that the ammonia content of the metavanadate is decomposed at fusion temperatures above 500° C. to form nitrogen and hydrogen gas. Hydrogen gas reduces the pure $V_2O_5$ to $V_2O_4$. The fusion temperature of reduced $V_2O_4$ is in excess of 1000° C. with the result that large masses of solid reduced $V_2O_4$ form in the furnace and prevent the melting and casting of dust-free particles. Remedies such as the use of oxygen lances, and prolonged heating with excess air destroy refractories and are costly, and as a result, the melting operation is intermittent and expensive to conduct.

Among the important objects of this invention is to expel the ammonia from the ammonium metavanadate as ammonia gas and separating it from the vanadium oxide as a gas as a preparation step for heating the metavanadate to fusion temperatures. The ammonia content of the gas can be recovered and reused in the process, while at the same time maintaining the vanadium in the material under treatment in the pentoxide form for subsequent melting to form fused oxide.

Another object of my invention is to provide a continuous flow of fully oxidized vanadium oxide powder from which the ammonia has been separated as feed for the subsequent melting operation.

Still another object of the invention is to provide a novel aparatus suitable for use in producing a continuous flow of pure fused oxide to a cooling and flaking device to produce dust-free particles.

The practice of my invention will be described with reference to the accompanying drawings illustrating a typical flow sheet for a commercial installation and certain novel apparatus arrangements and details utilized in such an operation. In the drawings, in the several views of which like parts bear similar reference numerals, FIG. 1 is a representative flow sheet for commercial installations;

Figure 1:
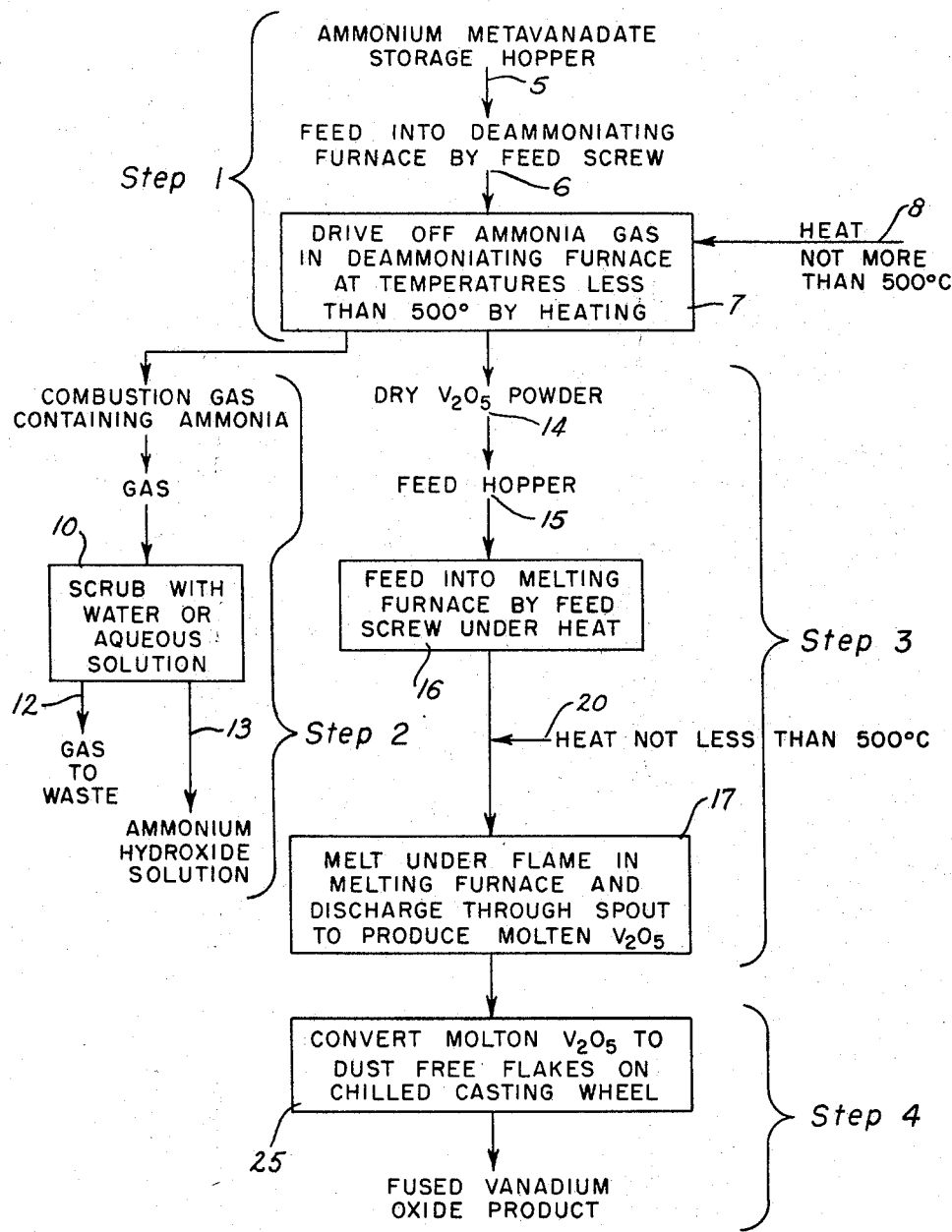

According to the practice of the invention herein described and as illustrated in the flow sheet, FIG. 1, and and in FIGS. 2 and 3, the objects desired are effected in four related steps as follows:

Step 1.—Ammonium metavanadate, which is usually in the form of a wet filter cake containing from 10 to 20 percent moisture approximately, is fed from a holding bin or other suitable container 5 by a controlled screw feeder 6 or similar device for introduction in a drying and deammoniating furnace 7 in which the temperature is carefully regulated to decompose the ammonium metavanadate into ammonia gas ($NH_3$) and vanadium pentoxide. Usually, temperatures approximating 400° C. and not more than 500° C. are employed. The reason for this has been found that the reaction of disassociation of $NH_3$ into nitrogen and hydrogen by the reversible reaction:

$2NH_3 \rightleftharpoons N_2 + 3H_2$, shifts to the right by the catalytic effect of vanadium pentoxide at temperatures above 500° C. Temperatures below 500° keep the reaction to the left. At higher temperatures, (such as in fusion) vanadium oxides apparently form nitrides and expel nitrogen on cooling. The deammoniating drier should be operated with an oxidizing atmosphere, and the heat input may be provided by burners (not shown) directed through intake ports 8.

This operation may be conducted in any convenient furnace in which the temperature and gas composition can be controlled, such as a direct fired single hearth furnace, a rotary furnace or an indirect fired rotary drier. The preferred furnace is one designed to produce the minimum amount of fine dust, such as a hearth furnace 7 of FIG. 2, although any suitable design can be used at the desire of the operator. As shown in FIG. 2, the gas discharge from furnace 7 passes into a line 9 as feed to a scrubber stage.

*Step 2.*—The ammonia gas thus liberated from the deammoniating furnace is then treated to recover the ammonia. This is done by conducting the hot gas into scrubbing towers 10 of conventional design where the gas is cooled by water sprays 11 which extract the ammonia as an ammonium hydroxide solution. This can be used in the related process of producing ammonium metavanadate as described in my copending patent application Ser. No. 242,532, or in any other manner desired by the operator. Features of such treatment disclosed but not claimed herein have been claimed in Ser. No. 242,532, filed Dec. 2, 1962 for Process for Recovering Pure Oxide from Low Grade Vanadium Ores or Concentrates. While the reuse of the ammonia gas is not essential to the melting of pure vanadium oxide, it confers economic advantages which can be obtained at the will of the operator. The scrubbed gas is discharged from the scrubbing tower 10 by line 12 to pass to waste or other treatment. The ammonium hydroxide solution discharges from tower 10 through a line 13 for circuiting to a treatment such as described above or otherwise is collected as a valuable product of the treatment.

*Step 3.*—The deammoniated $V_2O_5$, as a dry powder free of ammonia, is discharged at 14 from the deammoniating furnace 7 (Step 1) into a hopper 15 by which it is fed by a screw feeder 16 or other suitable device into a new and novel fusion furnace 17 at a steady flow regulated by the rate of feed flow into Step 1.

Figure 3:
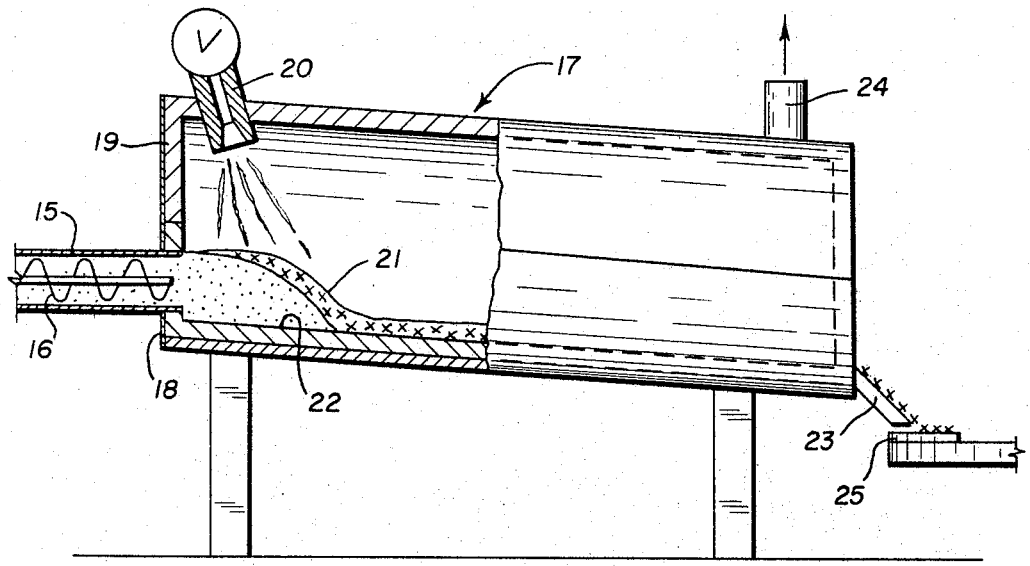
FIG. 3 is a side elevation of the fusion furnace shown in FIG. 2 and partially in section to show the arrangement of interior parts.
Figure 4:
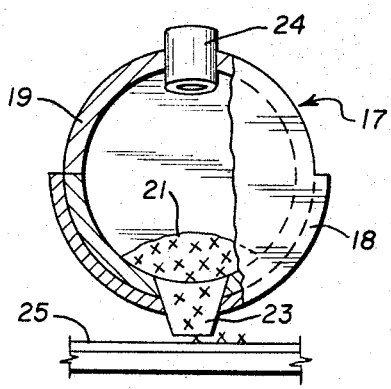
FIG. 4 is an end view, partially in section, of the discharge end of the fusion furnace shown in FIG. 3.

The fusion furnace, as shown in FIG. 3, is an insulated cylinder or box made of steel lined with basic refractory or vanadium-resistant alloys 19, into which the powdered $V_2O_5$ from furnace 7 is continuously pushed under and into an impinging flame from natural gas or oil, directed by one or a plurality of nozzles 20 as shown at 21. The dry oxide is fused continuously as it is pushed into the flame from above and the molten oxide flows downward in a sloping bottom 22 to a tapping spout 23 to pass to Step 4 while the fusion gas is conducted to a flue 24 by which it is conducted out of the furnace to waste or other disposition.

This step is conducted at a temperature of approximately 800° C. under oxidizing conditions at which the dry powder of pure $V_2O_5$ fuses easily without dusting because it is pushed into the fusion furnace and into the flame as a thin layer which tends to sinter before entering into the flame area to be melted. The underflow feeding screw 16 is also protected from the heat of the fusion flame by the dry vanadium oxide.

The essential feature of this step of the invention is the introduction of the vanadium to be fused, in a form free of ammonia, under and into a fusion flame containing excess oxygen (at least 8 percent) while maintained in the form of a continuously exposed surface where the underfeed is cool (less than 300°) and the surface is continuous melting and running down and away from the incoming feed.

I have found that the speed of melting can be maintained to coincide with the rate of feeding into Step 1 by having an adjustable capacity burner or burners on the fusion furnace, and properly operated, only a small amount of vanadium is tied up in drying and fusion steps.

The fusion furnace can be constructed in several shapes and with different materials at the desire of the operator. The furnace lining can be either of refractory high alumina brick, or other basic refractory material such as chrome refractory or silicon carbide, or by refractory alloys such as cast stainless steel high in chromium. The area subject to heat can be waterjacketed, if desired, to create a thin chilled layer of fused oxide on the bottom of the furnace.

Figure 2:
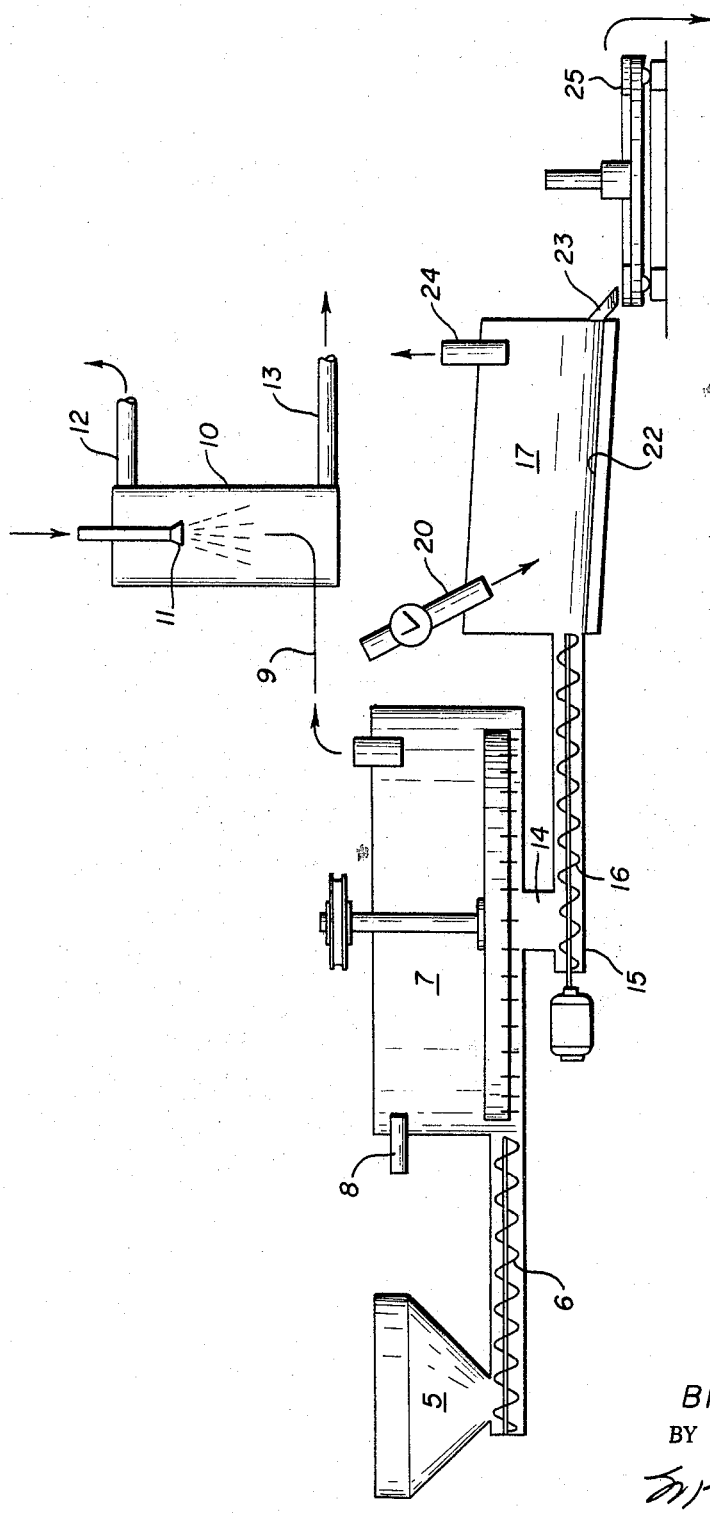
FIG. 2 is a side elevation of the apparatus arrangement of the circuit shown in FIG. 1, depicting the apparatus features in more or less schematic form.

*Step 4.*—As best shown in FIG. 2, the molten vanadium pentoxide flows continuously out of the fusion furnace outlet 23 onto a moving chilled iron surface 25 which is water cooled and forms thin flakes or particles which are readily moved off of the surface into convenient storage and packing facilities. The preferred apparatus for carrying out this step is embodied in Patent No. 2,298,464 (Burwell).

The rapid heat exchange action resulting from the deposit of the molten material on the chilled surfaces permits the vanadium pentoxide to congeal in flakes or particles within a relatively short time interval. As a consequence, I prefer to have a rotating surface as the moving surface with material deposited adjacent the periphery and removed therefrom in less than a single cycle of revolution. The product discharge of the chilling operation gives the final product of the treatment and comprises fused vanadium oxide of a high purity containing not less than 99.5% $V_2O_5$ and not more than .1% sodium.

In many treatments, the ammonium metavanadate comprising the feed to the fusion circuit is produced in another circuit in the same plant. As an example, the procedure of my copending application Ser. No. 242,532 may be utilized in a separate circuit for producing the ammonium metavanadate as noted in Step 2, and the ammonia evolved in the deammoniating furnace may be collected and returned to said circuit as gaseous ammonia, or may be scrubbed with water to form an aqueous solution of ammonia hydroxide as a product of the fusion treatment or for return to the ammonium metavanadate production circuit.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

I claim:

1. The method of producing fused vanadium oxide of high purity containing not less than 99.5 percent $V_2O_5$ from ammonium metavanadate in a continuous process, which comprises continuously feeding ammonium metavanadate in a controlled quantity into a deammoniating furnace, maintaining the temperature in a deammoniating furnace between 400° C. and 500° C., whereby the ammonia content of the feed separates as gaseous ammonia from vanadium pentoxide formed as an ammonia-free powder, feeding such dry vanadium pentoxide powder in a thin stream into a fusion furnace at a controlled rate, directing the incoming powder along a declining course through the furnace while subjected to a downwardly directed impinging flame containing excess oxygen, thereby establishing temperatures in excess of 500° C. in the furnace under oxidizing conditions and capable of continuously melting surface portions of the entering feed stream which shield underlying cooler covered portions of said feed, continuously moving molten surface vanadium oxide down and away from the incoming stream and the declining course, conducting the separated molten vanadium oxide onto a heat-exchange surface capable of chilling said oxide rapidly so as to form a dust-free product, and removing said product from the heat-exchange surface after chilling.

2. A method as defined in claim 1, in which the temperature in the deammoniating furnace approximates but does not exceed 500° C.

3. A method as defined in claim 1, in which the temperature in the fusion furnace is maintained between 500° C. and about 800° C.

4. A method as defined in claim 1, in which the temperature in the fusion furnace approximates but does not exceed 800° C.

5. A method as defined in claim 1, in which the gaseous ammonia separated in the deammoniating furnace is cooled and scrubbed to form aqueous ammonium hydroxide as a product of the treatment.

6. A method as defined in claim 1, in which the flame propagation in the fusion furnace contains at least 8% excess oxygen.

7. A method as defined in claim 1, in which the rate of feed introduction into the fusion furnace is balanced to the rate of feed introduction into the deammoniating furnace.

8. A method as defined in claim 1, in which a progressive movement of the vanadium pentoxide along the declining course in the fusion furnace is induced by the impelling action of the feed introduction.

References Cited

UNITED STATES PATENTS

| | | | |
|---|---|---|---|
| 2,298,464 | 10/1942 | Burwell | 23—140 |
| 3,067,008 | 12/1962 | Pilloton | 23—140 |
| 3,087,786 | 4/1963 | Schoder | 23—140 |

OSCAR R. VERTIZ, *Primary Examiner.*

H. T. CARTER, *Assistant Examiner.*